US00RE40634E

(19) United States
(12) Reissued Patent
Blair et al.

(10) Patent Number: US RE40,634 E
(45) Date of Reissued Patent: Feb. 10, 2009

(54) VOICE INTERACTION ANALYSIS MODULE

(75) Inventors: Christopher Douglas Blair, South Chailey (GB); Roger Louis Keenan, London (GB)

(73) Assignee: Verint Americas, Melville, NY (US)

(21) Appl. No.: 11/509,553

(22) Filed: Aug. 24, 2006

Related U.S. Patent Documents

Reissue of:
(64) Patent No.: 6,757,361
Issued: Jun. 29, 2004
Appl. No.: 10/073,966
Filed: Feb. 14, 2002

U.S. Applications:
(62) Division of application No. 11/477,124, filed on Jun. 28, 2006.

(30) Foreign Application Priority Data

Sep. 26, 1996 (GB) ..... 9620082

(51) Int. Cl.

| | |
|---|---|
| ***H04M 1/64*** | (2006.01) |
| ***H04M 15/00*** | (2006.01) |
| ***G10L 21/00*** | (2006.01) |
| ***G10L 11/04*** | (2006.01) |
| ***H04L 12/66*** | (2006.01) |

(52) U.S. Cl. ..... 379/67.1; 370/436; 379/85; 379/88.04; 379/135; 455/436; 704/209; 704/273; 704/275

(58) Field of Classification Search ..... 379/67.1, 379/85, 88.04, 135; 370/352; 455/436, 422; 704/209, 273, 275

See application file for complete search history.

(56) References Cited

U.S. PATENT DOCUMENTS 3,855,418 A 12/1974 Fuller
4,093,821 A 6/1978 Williamson (Continued)

FOREIGN PATENT DOCUMENTS

| | | | |
|---|---|---|---|
| EP | 0 510 412 | | 10/1992 |
| EP | 0833489 | A3 | 4/1998 |
| EP | 0841832 | A2 | 5/1998 |
| EP | 1319299 | B1 | 12/2005 |
| GB | 2 257 872 | | 1/1993 |
| GB | 2352948 | A | 2/2001 |
| WO | WO 9741674 | A | 11/1997 |
| WO | WO 0028425 | A | 5/2000 |
| WO | WO 0052916 | A | 9/2000 |
| WO | WO 03107622 | | 12/2003 |

OTHER PUBLICATIONS

Lieberman et al., "Some Aspects of Fundamental Frequency and Envelope Amplitude as Related to the Emotional Content of Speech", The Journal of the Acoustical Society of America, vol. 34, previously presented. 922–927 (Jul. 1962).
So–Lin Yen et al. "Intelligent MTS Monitoring System", Oct. 1994, pp. 185–187, Scientific and Research Center for Criminal Investigation, Taiwan, Republic of China.

(Continued)

*Primary Examiner*—William D. Cumming
(74) *Attorney, Agent, or Firm*—Lawrence A. Aaronson

(57) ABSTRACT

A signal monitoring apparatus and method involving devices for monitoring signals representing communications traffic, devices for identifying at least one predetermined parameter by analyzing the context of the at least one monitoring signal, a device for recording the occurrence of the identified parameter, a device for identifying the traffic stream associated with the identified parameter, a device for analyzing the recorded data relating to the occurrence, and a device, responsive to the analysis of the recorded data, for controlling the handling of communications traffic within the apparatus.

22 Claims, 2 Drawing Sheets

U.S. PATENT DOCUMENTS

| | | | | | |
|---|---|---|---|---|---|
| 4,142,067 | A | | 2/1979 | Williamson | |
| 4,567,512 | A | | 1/1986 | Abraham | |
| 4,837,804 | A | | 6/1989 | Akita | |
| 4,866,704 | A | * | 9/1989 | Bergman | |
| 4,912,701 | A | * | 3/1990 | Nicholas | |
| 4,914,586 | A | * | 4/1990 | Swinehart et al. | |
| 4,924,488 | A | | 5/1990 | Kosich | |
| 4,939,771 | A | * | 7/1990 | Brown et al. | |
| 4,969,136 | A | | 11/1990 | Chamberlin et al. | |
| 4,972,461 | A | * | 11/1990 | Brown et al. | |
| 4,975,896 | A | | 12/1990 | D'Agosto, III et al. | |
| 5,036,539 | A | | 7/1991 | Wrench, Jr. et al. | |
| 5,070,526 | A | | 12/1991 | Richmond et al. | |
| 5,101,402 | A | | 3/1992 | Chin et al. | |
| 5,166,971 | A | | 11/1992 | Vollert | |
| 5,260,943 | A | | 11/1993 | Comroe et al. | |
| 5,274,572 | A | | 12/1993 | O'Neill et al. | |
| 5,309,505 | A | * | 5/1994 | Szlam et al. | |
| 5,339,203 | A | * | 8/1994 | Henits et al. | |
| 5,353,168 | A | | 10/1994 | Crick | |
| 5,355,406 | A | | 10/1994 | Chencinski et al. | |
| 5,390,243 | A | | 2/1995 | Casselman et al. | |
| 5,396,371 | A | | 3/1995 | Henits et al. | |
| 5,398,245 | A | | 3/1995 | Harriman, Jr. | |
| 5,434,797 | A | | 7/1995 | Barris | |
| 5,440,624 | A | | 8/1995 | Schoof, II | |
| 5,446,603 | A | | 8/1995 | Henits et al. | |
| 5,448,420 | A | | 9/1995 | Henits et al. | |
| 5,488,652 | A | | 1/1996 | Bielby et al. | |
| 5,500,795 | A | | 3/1996 | Powers et al. | |
| 5,526,407 | A | | 6/1996 | Russell et al. | |
| 5,533,103 | A | | 7/1996 | Peavey et al. | |
| 5,535,256 | A | * | 7/1996 | Maloney et al. | 379/309 |
| 5,535,261 | A | | 7/1996 | Brown et al. | |
| 5,615,296 | A | | 3/1997 | Stanford et al. | |
| 5,621,786 | A | * | 4/1997 | Fischer et al. | 455/436 |
| 5,623,539 | A | | 4/1997 | Bassenyemukasa et al. | |
| 5,623,609 | A | | 4/1997 | Palmer et al. | |
| 5,647,834 | A | | 7/1997 | Ron | |
| 5,657,383 | A | | 8/1997 | Gerber et al. | |
| 5,696,811 | A | | 12/1997 | Maloney et al. | |
| 5,712,954 | A | | 1/1998 | Dezonno | |
| 5,717,879 | A | | 2/1998 | Moran et al. | |
| 5,719,786 | A | | 2/1998 | Nelson et al. | |
| 5,737,405 | A | | 4/1998 | Dezonno | |
| 5,764,901 | A | | 6/1998 | Skarbo et al. | |
| 5,787,253 | A | | 7/1998 | McCreery et al. | |
| 5,790,798 | A | | 8/1998 | Beckett, II et al. | |
| 5,802,533 | A | | 9/1998 | Walker | |
| 5,818,907 | A | | 10/1998 | Maloney et al. | |
| 5,818,909 | A | | 10/1998 | Van Berkum et al. | |
| 5,819,005 | A | | 10/1998 | Daly et al. | |
| 5,822,727 | A | | 10/1998 | Garberg et al. | |
| 5,826,180 | A | | 10/1998 | Golan | |
| 5,848,388 | A | | 12/1998 | Power et al. | |
| 5,861,959 | A | | 1/1999 | Barak | |
| 5,918,213 | A | | 6/1999 | Bernard et al. | |
| 5,937,029 | A | | 8/1999 | Yosef | |
| 5,946,375 | A | | 8/1999 | Pattison et al. | |
| 5,960,063 | A | | 9/1999 | Kuroiwa et al. | |
| 5,983,186 | A | * | 11/1999 | Miyazawa et al. | 704/275 |
| 5,999,525 | A | * | 12/1999 | Krishnaswamy et al. | 370/352 |
| 6,035,017 | A | | 3/2000 | Fenton et al. | |
| 6,046,824 | A | | 4/2000 | Barak | |
| 6,047,060 | A | | 4/2000 | Fedorov et al. | |
| 6,058,163 | A | | 5/2000 | Pattison et al. | |
| 6,108,782 | A | | 8/2000 | Fletcher et al. | |
| 6,122,665 | A | | 9/2000 | Bar et al. | |
| 6,151,571 | A | * | 11/2000 | Pertrushin | 704/209 |
| 6,169,904 | B1 | | 1/2001 | Ayala et al. | |
| 6,233,234 | B1 | | 5/2001 | Curry et al. | |
| 6,233,256 | B1 | | 5/2001 | Dieterich et al. | |
| 6,246,752 | B1 | * | 6/2001 | Bscheider et al. | 379/88.22 |
| 6,246,759 | B1 | | 6/2001 | Greene et al. | |
| 6,249,570 | B1 | | 6/2001 | Glowny et al. | |
| 6,252,946 | B1 | | 6/2001 | Glowny et al. | |
| 6,252,947 | B1 | | 6/2001 | Diamond et al. | |
| 6,282,269 | B1 | | 8/2001 | Bowater et al. | |
| 6,288,739 | B1 | | 9/2001 | Hales et al. | |
| 6,320,588 | B1 | | 11/2001 | Palmer et al. | |
| 6,330,025 | B1 | | 12/2001 | Arazi et al. | |
| 6,351,762 | B1 | | 2/2002 | Ludwig et al. | |
| 6,356,294 | B1 | | 3/2002 | Martin et al. | |
| 6,370,574 | B1 | | 4/2002 | House et al. | |
| 6,404,857 | B1 | | 6/2002 | Blair et al. | |
| 6,418,214 | B1 | | 7/2002 | Smythe et al. | |
| 6,463,415 | B2 | * | 10/2002 | St. John | 704/273 |
| 6,510,220 | B1 | | 1/2003 | Beckett, II et al. | |
| 6,538,684 | B1 | | 3/2003 | Sasaki | |
| 6,542,602 | B1 | | 4/2003 | Elazar | |
| 6,560,328 | B1 | | 5/2003 | Bondarenko et al. | |
| 6,570,967 | B2 | | 5/2003 | Katz | |
| 6,668,044 | B1 | | 12/2003 | Schwartz et al. | |
| 6,690,663 | B1 | | 2/2004 | Culver | |
| 6,728,345 | B2 | | 4/2004 | Glowny et al. | |
| 6,754,181 | B1 | | 6/2004 | Elliott et al. | |
| 6,757,361 | B2 | | 6/2004 | Blair et al. | |
| 6,775,372 | B1 | | 8/2004 | Henits | |
| 6,785,369 | B2 | | 8/2004 | Diamond et al. | |
| 6,785,370 | B2 | | 8/2004 | Glowny et al. | |
| 6,865,604 | B2 | | 3/2005 | Nisani et al. | |
| 6,871,229 | B2 | | 3/2005 | Nisani et al. | |
| 6,880,004 | B2 | | 4/2005 | Nisani et al. | |
| 6,959,079 | B2 | | 10/2005 | Elazar | |
| 2001/0043697 | A1 | | 11/2001 | Cox et al. | |
| 2004/0028193 | A1 | | 2/2004 | Kim | |
| 2004/0064316 | A1 | | 4/2004 | Gallino | |

OTHER PUBLICATIONS

Network Resource Group of Lawrence Berkeley National Laboratory, *vat–LBNL Audio Conferencing Tool,* at web.archive.org/web/19980126183021/www–nrg.ee.lbl.gov/vat (Jan. 26, 1998), 5 pp.

Mash Research Team, *vic–video conference,* at web.archive.org/web/19980209092254/mash.cs.berkeley.edu/mash (Feb. 9, 1998), 11 pp.

Mash Research Team, *Player,* at web.archive.org/web/19980209092521/mash.cs.berkeley.edu/mash (Feb. 9, 1998), 3 pp.

Intel Corporation, *Intel Internet Video Phone Trial Applet 2.1: The Problems and Pitfalls of Getting H.323 Safely Through Firewalls,* at web.archive.org/web/19980425132417//http://support.intel.com/support/videophone/trial21/h323__wpr.htm#a18 (Apr. 24, 1998), 32 pp.

Posting of Brett Eldridge to muc.lists.firewalls: MS NetMeeting 2.0 and Raptor Eagle vers. 4.0, at groups–beta.google.com/groups/muc.lists.firewalls/browse__thread/thread/ec0225b64bf36ad4?tvc=2 (May 2, 1997), 3 pp.

Press Release, RADCOM, Breakthrough Internetworking Application for Latency & Loss Measurements from RADCOM, at web.archive.org/web/19980527022443/www.radcom–inc.com/press21.htm (May 27, 1998), 2 pp.

RADCOM, Supported Protocols, at http://web.archive.org/web/19980527014033/www.radcom–inc.com/protocol.htm (May 27, 1998), 10 pp.

Press Release, RADCOM, RADCOM Adds UNI 4.0 Signalling and MPEG–II Support to ATM Analysis Solutions, at web.archive.org/web/19980527022611/www.radcom–inc.com/press13.htm (May 27, 1998), 1 p.

RADCOM, *Prism200 Multiport WAN/LAN/ATM Analyzer,* at web.archive.org/web/19980527020144/www.radcom–inc.com/pro–p1.htm (May 27, 1998), 3 pp.

Beckman, Mel,*See and hear your network,* at archive.org/web/19990224183147/macworld.zdnet.com/pages/june.96/Reviews.2144.html (Feb. 24, 1999), 3 pp.

AG Group, Inc., *About Satellite,* at archive.org/web/19980206033053/www.aggroup.com/skyline (Feb. 6, 1998), 1 p.

Check Point, *Supported Applications,* at web.archive.org/web/19980212233542/www.checkpoint.com/products/technology/index.html (Feb. 12, 1998), 6 pp.

Check Point, *Stateful Inspection in Action,* at web.archive.org/web/19980212235911/www.checkpoint.com/products/technology/page2.html. (Feb. 12, 1998), 4 pp.

Check Point, *Check Point FireWall–1: Extensible Stateful Inspection,* at web.archive.org/web/19980212235917/www.checkpoint.com/products/technology/page3.html (Feb. 12, 1998), 3 pp.

RADCOM, *PrismLite: Portable WAN/LAN/ATM Protocol Analyzer,* at http://web.archive.org/web/19980527020156/www.radcom–inc.com/pro–p2.htm (May 27, 1998), 3 pp.

Simpson, David, *Viewing RTPDump Files,* at ://bmrc.berkeley.edu/~davesimp/viewingNotes.html (Oct. 12, 1996), 1 p.

Waldbusser, S., *RFC 1757—Remote Network Monitoring Management Information Base,* at //www.fas.org/rfcs/rfc1747.html (Feb. 1995), 65 pp.

Cohen, D. "A Voice Message System", Proceedings of the IFIP TC–6 International Symposium on Computer Message Systems, Computer Message Systems, edited by Ronald P. Uhlig, Bell Northern Research Limited, Ottawa, Canada, Apr. 6–8, 1981, pp. 17–28.

Cohen, D. "On Packet Speech Communication", Proceedings of the Fifth International Conference, Computer Communications: Increasing Benefits to Society, The International Council for Computer Communication, Hosted by American Telephone and Telegraph Company., Atlanta, Georgia, Oct. 27–30, 1980. pp. 269–274.

Cohen, Danny, "Packet communication of online speech", USCI, Information Sciences Institute, Marina del Rey, CA, National Computer Conference, 1981, pp. 169–176.

Cohen, Danny, NWG/RFC 741, "Specification for the Network Voice Protocol (NVP)", ISI, DC, Nov. 22, 1977, 40 pages.

Holfelder, Wieland, Tenet Group, International Computer Science Institute and University of California, "VCR(1), MBone VCR—Mbone Video Conference Recorder", Berkley, CA, Nov. 5, 1995, pp. 1–8.

Information Sciences Institute, University of Southern California, Marina del Rey, "RFC:791 Internet Protocal DARPA Internet Program Protocol Specification", Prepared for Defense Advanced Research Projects Agency Information Processing Techniques Office, Arlington, VA, Sep. 1981, pp. 1–45.

Schulzrinne, Henning, "NeVoTImplementation and Program Structure", GMD Fokus, Berlin, Feb. 9, 1996, pp. 1–16.

Schulzrinne, Henning, "Voice Communication Across the Internet: A Network Voice Terminal", Dept. of Electrical and Computer Engineering, Dept. of Computer Science, Univ. of Massachusetts, Amherst, MA Jul. 29, 1992, pp. 1–34.

Terry, Douglas B. and Daniel C. Swinehart, "Managing Stored Voice in the Etherphone System", Computer Science Laboratory, Xerox Palo Alto Research Center, 1987, pp. 103–104.

Zellweger, Polle T., Douglas B. Terry, and Daniel C. Swinehart, "An Overview of the Etherphone System and Its Applications", Xerox Palo Alto Research Center, Palo Alto, CA, 1988, pp. 160–168.

Magar, Surendar S. et al., "A Microcomputer with Digital Signal Processing Capability," Session II: Digital Signal Processors, ISSCC 82, IEEE, 1982, 4 pages.

Abadjieva, Elissaveta et al., "Applying Analysis of Human Emotional Speech to Enhance Synthetic Speech," The MicroCentre, Department of Mathematics and Computer Science, The University, Scotland, U.K., 1993, pp. 909–912.

Wilpon, Jay G. et al., "Automatic Recognition of Keywords in Unconstrained Speech Using Hidden Markov Models," IEEE Transactions of Acoustics, Speech, and Signal Processing, vol. 38, No. 11, Nov. 1990, pp. 1870–1878.

Frick, Robert W., "Communicating Emotion: The Role of Prosodic Features," Physchological Bulletin, vol. 97, No. 3, 1985, pp. 412–429.

Byun, Jae W. et al., "The Design and Analysis of an ATM Multicast Switch with Adaptive Traffic Controller," IEEE/ACM Transactions on Networking. vol. 2, No. 3, Jun. 1994, pp. 288–298.

Oppenheim, Alan V. et al., "Digital Signal Processing," Prentice–Hall, Inc., Englewood Cliffs, New Jersey, 1974, 4 pages.

Rose, Richard C., "Discriminant Wordspotting Techniques for Rejecting Non–Vocabulary Utterances in Unconstrained Speech," IEEE, 1992, pp. 105–108.

Engineering and Operations in the Bell System (Second edition), Members of the Technical Staff and the Technical Publication Department, AT&T Bell Laboratories, Murray Hill, New Jersey, 1984, 6 pages.

Callegati, Franco et al., "On the Dimensioning of the Leaky Bucket Policing Mechanism for Multiplexer Congestion Avoidance," IEEE, 1993, pp. 617–621.

Erimli, Bahadir et al., "On Worst Case Traffic in ATM Networks," The Institution of Electrical Engineers, IEE, Savoy Place, London, U.K., 1995, 12 pages.

Bullock, Darcy et al., "Roadway Traffic Control Software," IEEE Transactions on Control Systems Technology, vol. 2. No. 3, Sep. 1994, pp. 255–264.

Cahn, Janet E., "The Generation of Affect in Synthesized Speech," Journal of the American Voice I/O Society, vol. 8(Jul. 1990), pp. 1–19.

Rabiner, Lawrence R., "A Tutorial on Hidden Markov Models and Selected Applications in Speech Recognition," Proceedings of the IEEE, vol. 77, No. 2 (Feb. 1989), pp. 257–286.

Southcott, C.B. et al., "Voice Control of the Pan–European Digital Mobile Radio System," IEEE, 1989. pp. 1070–1074.

Nice Systems Ltd.'s content analysis package, "Emotion Detection," Ra'Anana, Israel, 2005, 33 pages.

Nice Systems Ltd.'s content analysis package, "Talk Analysis Application Phase II," Ra'Anana, Israel, 7 pages.

Recognition and Transcription Software, Dragon Medical Transcription services, http://www.dragonmedical–transcription.com/history_speech_recognition.html, 4 pages.
Telecommunication Standardization Sector of International Telecommunication Union, Recommendation H.245 Control Protocol for Multimedia Communication, Feb. 1998.
Telecommunication Standardization Sector of International Telecommunication Union, Recommendation H.225 Call Signaling Protocols and Media Stream Packetization for Packet–Based Multimedia Communication Systems, Feb. 1998 (WSISTS000177–331).
Telecommunication Standardization Sector of International Telecommunications Union, Recommendation H.323 Packet–Based Multimedia Communications Systems, Feb. 1998 (WSISTS000049–176).
Ruiz, Antonio, Voice and Telephony Applications for the Office Workstation, 1st International Conference on Computer Workstations, IEEE Computer Society Press (Nov. 11–14, 1985).
Swinehart, Daniel C., Telephone Management in the Etherphone System, IEEE/IEICE Global Telecommunications Conference, Tokyo Conference Proceedings, vol. 2 of 3 (1987).
Swinehart, D.C. et al., Adding Voice to an Office Computer Network, IEEE Global Telecommunications Conference, San Diego, California, Conference Record vol. 1 or 3 (Nov. 28–Dec. 1, 1983).
Terry, Douglas B., Distributed System Support for Voice in Cedar, Proc. Of Second European SIGOPS Workshop on Distributed Systems (Aug. 1986)
Clark, David D. et al., Supporting Real–Time Applications in an Integrated Services Packet Network: Architecture and Mechanism, Conference Proceedings on Communications Architectures & Protocols (Aug. 17–20, 1992).
Vin, Harrick M. et al., Multimedia Conferencing in the Etherphone Environment, IEEE Computer Society Press, vol. 24, Issue 10 (Oct. 1991).
Terry, Douglas B. et al., Managing Stored Voice in the Etherphone System, ACM Transactions on Computer Systems, vol. 6, No. 1, ACM 0734–2071/88/0200–0003 (Feb. 1988).
Boggs, David R., "Pup: An Internetwork Architecture," IEEE Transaction on Communications, vol. COM–28, No. 4 (Apr. 1980), pp. 612–624.
Postel, Jonathan B. et al., The ARPA Internet Protocol, Computer Networks: The International Journal of Distributed Informatique, vol. 5, No. 4 (Jul. 1981).
Mash Research Team Recorder, at http://web.archive.org/web/19980209092445/mash.cs.berkeley.edu/mash/software/recorder–usage.html (archived Feb. 9, 1998).
Mash Research Team, Archive Tools Overview (last modified Aug. 30, 1997) at http://web.archive.org/web/199802092409/mash.cs.berkeley.edu/mash/software/archive–usage.html (archived Feb. 9, 1998).
Howell, Peter et al., "Development of a Two–Stage Procedure for the Automatic Recognition of Dysfluencies in the Speech of Children Who Stutter: I. Psychometric Procedures Appropriate for Selection of Training Material for Lexical Dysfluency Classifiers," University College London, Department of Psychology, J Speech Lang Hear Res., vol. 40, Issue 5, (Oct. 1997), pp. 1073–1084.
Schuett, A. et al., A Soft State Protocol for Accessing Multimedia Archives, Proc. 8th International Workshop on Network and Operating Systems Support for Digital Audio and Video (NOSSDSV), Jul. 1998, 11 pgs.
Witness Systems, Inc., Local Patent Rule (LPR) 4.3 Disclosures (including claim chart), submitted to the Court in STS Software Systems Ltd. v. Witness Systems, Inc. et al., U.S. District Court, Northern District of Georgia, Atlanta Division, Case No. 1:04–CV–2111–RWS on Apr. 25, 2005, 36 pgs.
Witness Systems, Inc., Supplemental Local Patent Rule (LPR) 4.3 Disclosures (including claim chart), submitted to the Court in STS Software Systems Ltd.v. Witness Systems, Inc. et al., U.S. District Court Northern District of Georgia, Atlanta Division, Case No. 1:04–CV–2111–RWS on Sep. 9, 2005, 19 pgs.
Witness Systems, Inc., Second Supplemental Local Patent Rule (LPR) 4.3 Disclosures (including claim chart), submitted to the Court in STS Software Systems Ltd. v. Witness Systems, Inc. et al., U.S. District Court Northern District of Georgia, Atlanta Division, Case No. 1:04–CV–2111–RWS on Jan. 29, 2007, 48 pgs.
Witness Systems, Inc., Third Supplemental Local Patent Rule (LPR) 4.3 Disclosures (including claim chart), submitted to the Court in STS Software Systems Ltd. v. Witness Systems, Inc. et al., U.S. District Court Northern District of Georgia, Atlanta Division, Case No. 1:04–CV–2111–RWS on Feb. 20, 2007, 20 pgs.
Witness Systems, Inc., Fourth Supplemental Local Patent Rule (LPR) 4.3 Disclosures (including claim chart), submitted to the Court in STS Software Systems Ltd., v. Witness Systems, Inc., et al., U.S. District Court Northern District of Georgia, Atlanta Division, Case No. 1:04–CV–2111–RWS on Mar. 22, 2007, 69 pages.
Parnes, Peter et al., mMOD: The Multicast Media On–Demand System, Lulea University of Technology, Sweden, Mar. 6, 1997.
Hirschberg, Julia et al., "Experiments in Emotional Speech," Columbia University (Feb. 18, 2003), 4 pgs.
Posting of Michael Pelletier to comp. security.firewalls: Netmeeting through a packet filter, at http://groups–beta.google.com/group/comp.security.firewalls/browse_thread/thread/c14c3a7d190a58/a4010ede22ff83ao, Jan. 23, 1998, 4 pgs.
Communications Solutions CTI News, at http://www.tmcnet.com/articles/ctimag/0699/0699news.htm, Jun., 1999.
Press Release, RADCOM, New VoIP Testing Applications from RADCOM, at www.radcom.com/radcom/about/pr020999.htm, Feb. 9, 1999, 2 pages.
Willis, David, "Voice Over IP, The Way It Should Be," Network Computing, at http://www.nwc.com/1001/1001ws.12.html, Jan. 11, 1999.
Willis, David, "Hear it for yourself: Audio Samples from our H.323 test, Network Computing," at http://www.nwc.com/1001/1001ws2.html, Jan. 11, 1998.
Posting of Dameon D. Welch–Abernathy, Re: |fw–1_wizards↑ tcpdump for solaris 2.6, at http:oldfaq.phoneboy.com/gurus/20007/msg00081.html, Jul. 18, 2000.
Wessler, Dr. Barry, Rebuttal Expert Report, submitted to the Court in STS Software Systems Ltd. v. Witness systems, Inc. et al., U.S. District Court, Northern District of Georgia, Atlanta Division, Case No. 1:04–CV–2111–RWS on Nov. 6, 2007, 38 pages.
Witness Systems, Inc. Expert Report of Danny on Invalidity (28 pgs) with claim cart Exhibit C (44 pgs), submitted to the Court in STS Software Systems Ltd. v. Witness Systems, Inc. et al., U.S. District Court, Northern District of Georgia, Atlanta Division, Case No. 1:04–CV–2111–RWS on Sep. 19, 2007.

Witness Systems, Inc., Rebuttal Expert Report of Dr. Danny Cohen (53 pages) with claim chart Exhibit C (44 pgs), submitted to th Court in STS Software Systems Ltd. v. Witness Systems, Inc. et al., U.S. District Court, Northern District of Georgia, Atlanta Division, Case No. 1:04–CV–2111–RWS on Nov. 20, 2007.

Witness Systems, Inc., Expert Report of Stephen L. Casner on Invalidity (39 pgs.), with claim chart exhibits (Exhibit E–20 pgs; Exhibit F–24 pgs; Exhibit G–20 pgs; Exhibit H–41 pgs; Exhibit I–19 pgs; Exhibit J–20 pgs; Exhibit K–29 pgs; and Exhibit L–30 pgs), submitted to the Court in STS Software Systems Ltd. v. Witness Systems, Inc., et al., U.S. District Court, Northern District of Georgia, Atlanta Division, Case No. 1:04–CV–2111–RWS on Sep. 21, 2007.

Witness Systems, Inc. Rebuttal Export of Stephen Casner (75 pgs) with claim chart exhibits (Exhibit E–17 pgs; Exhibit F–21 pgs.; Exhibit H–38 pgs; and Exhibit L–26 pgs), submitted to the Court in STS Software Systems Ltd. v. Witness Systems, Inc. et al., U.S. District Court, Northern District of Georgia, Atlanta Division, Atlanta Divsion, Case No. 1:04–CV–2111–RWS on Nov. 20, 2007.

Thomke, Stefan, "Enlightened Experimentation: The New Imperative for Innovation," Harvard Business Review (HBR OnPoint), Product No. 6099 (Feb. 2001), pp. 1, 31–47.

Hamel, Gary et al., "Strategic Intent" Harvard Business Review (HBR), (May–Jun. 1989), 14 pgs.

Witness Systems, Inc., Expert Report of Dr. Jeffrey S. Vitter on Invalidity (including claim chart), submitted to the Court in Nice Systems, Inc. and Nice Systems Ltd. v. Witness Systems, Inc. et al., U.S. District Court, for the District of Delaware, Case No. 06–311–JJF on Dec. 21, 2007 (85 pgs).

Witness Systems, Inc., Expert Report of John Henits on Validity Issues, submitted to the Court in Nice Systems, Inc. and Nice Systems Ltd. v. Witness Systems, Inc. et al., U.S. District Court, for the District of Delaware, Case No. 06–311–JJF on Dec. 31, 2007 (99 pgs).

Nice Systems, Inc. and Nice Systems, Ltd.'s Local Patent Rule (LPR) 4.3 Disclosures (including claim chart) submitted to the Court in Witness Systems, Inc. v. Nice Systems, Inc. and Nice Systems, Ltd., District Court Northern District of Georgia, Atlanta Division, Case No. 1:06–CV–00126–RLV on May 1, 2006, 236 pgs.

Nice Systems, Inc. and Nice Systems, Ltd.'s Supplemental Local Patent Rule 4.3 Disclosures (including claim chart) submitted to the Court in Witness Systems, Inc. v. Nice Systems, Inc. and Nice Systems, Ltd., District Court Northern District Georgia, Atlanta Division, Case No. 1:06–CV–00126–TCB on Sep. 28, 2007, 131 pgs.

Nice Systems, Inc. and Nice Systems, Ltd.'s Second Supplemental Local Patent Rule 4.3 Disclosures submitted to the Court in Witness Systems, Inc. v. Nice Systems, Inc. and Nice Systems, Ltd., District Court Northern District of Georgia, Atlanta Division, Case No. 1:06–CV–00126–TCB on Oct. 23, 2007, 6 pgs.

Von Hippel, Eric et al., "Creating Breakthroughs at 3M," Harvard Business Review (HBR OnPoint), Product No. 6110 (Sep. –Oct. 1999), pp. 1, 19–29, 47.

Witness Systems, Inc., Expert Report of Dr. David D. Clark on Invalidity (60 pgs.), with claim chart exhibits (Exhibit E–38 pgs. Exhibit F–23 pgs.; Exhibit G –37 pgs.; Exhibit H–32 pgs.; Exhibit I–62 pgs.; Exhibit J–39 pgs.; and Exhibit K–41 pgs.), submitted to the Court in STS Sotware Systems Ltd. v. Witness Systems, Inc. et al., U.S. District Court, Northern District of Georgia, Atlanta Division, Case No. 1:04–CV–2111–RWS on Nov. 20, 2007.

Witness Systems, Inc., claim chart exhibits from Expert Report of Dr. David D. Clark on Invalidity (Exhibit L–43 pgs.; Exhibit M–19 pgs. Exhibit N–94 pgs.; and Exhibit O–61 pgs.), submitted to the Court in STS Software Systems Ltd. v. Witness Systems, Inc. et al., U.S. District Court, Northern District of Georgia, Atlanta Division, Case No. 1:04–CV–2111–RWS on Nov. 20, 2007.

Witness Systems, Inc., claim chart exhibits from Expert Report of Dr. David D. Clark on Invalidity (Exhibit P–13 pgs.; Exhibit Q–13 pgs. Exhibit R–22 pgs.; Exhibit S–50 pgs.; Exhibit T–24 pgs., Exhibit U–66 pgs.; Exhibit V–41 pgs.; and Exhibit W–36 pgs.), submitted to the Court in STS Software Systems Ltd. v. Witness Systems, Inc. et al., U.S. District Court, Northern District of Georgia, Atlanta Division, Case No. 1:04–CV–2111–RWS on Nov. 20, 2007.

Witness Systems, Inc., Rebuttal Expert Report of Dr. David D. Clark (115 pgs.), with claim chart exhibits (Exhibit E–35 pgs.; Exhibit J–36 pgs.; and Exhibit O–58 pgs.), submitted to the Court in STS Software Systems Ltd. v. Witness Systems, Inc., et al., U.S. District Court, Northern District of Georgia, Atlanta Division, Case No. 1:04–CV–2111–RWS on Nov. 20, 2007.

Wtiness Systems, Inc., claim chart exhibits from Rebuttal Expert Report of Dr. David D. Clark (Exhibit P–12 pgs.; Exhibit Q–12 pgs.; Exhibit R–19 pgs.; Exhibit S–47 pgs.; Exhibit U–63 pgs.; Exhibit V–37 pgs.; and Exhibit W–32 pgs.), submitted to the Court in STS Software Systems Ltd. v. Witness Systems, Inc. et al., U.S. District Court, Northern District of Georgia, Atlanta Division, Case No. 1:04–CV–2111–RWS on Nov. 20, 2007.

Howell, Peter et al., "Development of a Two–Stage Procedure for the Automatic Recognition of Dysfluencies in the Speech of Children Who Stutter: II. ANN Recognition of Repetitions and Prolongations With Supplied Word Segment Markers," University College London England, UKPMC Funders Group, J Speech Lang Hear Res., vol. 40, Issue 5 (Oct. 1997), pp. 1085–1096.

Touchstone Technologies, Inc., "Voice and Video over IP Test Solutions," Hatboro, Pennsylvania, (Sep. 19, 2006), 3 pgs.

Holfelder, W., "Interactive Remote Recording and Playback of Multicase Vidoeconferences," in Interactive Distributed Multimedia Systems and Telecommuncations Services, 4th International Workshop, IDMS '97, Darmstadt, Germany, 450–463 (Sep. 10–12, 1997 Proceedings, Steinmetz, R. and Wolf, L. Eds).

Glover, Mark V., "Internetworking: Distance Learning 'To Sea' via Disktop Videoconferencing Tools and IP Multicast Protocols" (Mar. 1998) (unpublished M. Sc. Thesis, Naval Postgraduate School, Monterey, California).

Maxemchuk, N.F., "An Experimental Speech Storage and Editing Facility," American Telephone and Telegraph Company, The Bell System Technical Journal, vol. 59, No. 8 (Oct. 1980), pp. 1383–1395.

Nicholson, Robert T., "Integrating Voice in the Coffee World," BYTE Publications Inc., McGraw–Hill, vol. 8, No. 12 (Dec. 1983), pp. 177–184.

Schmandt, Chris et al., "An Audio and Telephone Server for Multimedia for Multi–Media Workstations,"Media Laboratory, Massachusetts Institute of Technology, IEEE, 1988, pp. 150–159.

Thomas, Robert H. et al., "Diamond: A Multimedia Message System Built on a Distributed Architecture," IEEE, (Dec.1985), pp. 65–78.

Cohen, Danny, USC/ISI Summary of the ARPA/Ethernet Community Meeting, Xerox–Parc, Nov. 1979, 16 pgs.

Clark, main loop for Internet protocol (WSIST066835–WSIST066838), Dec. 3, 1979.

O'Mahony, Dr. Donal, Networks & Telecommunications Research Group, Trinity College Dublin, 1998, 80 pgs.

Saltzer, Jerome H. et al., "The Desktop Computer as a Network Participant," IEEE Journal on Selected Areas in Communications, vol. SAC–3, No. 3 (May 1985), pp. 468–478.

Ades, Stephen, "An Architecture for Integrated Services on the Local Area Network, " University of Cambridge, Computer Laboratory, Technical Report, No. 114, Sep. 1987, 177 pgs.

Emmerson, Bob et al., "The Surging CTI Tide," Byte, Nov. 1996, 3 pgs.

Speech Processing Peripheral (SPP) User's Manual, Adams–Russell Company, Inc., Digital Processing Division, Waltham, Massachussets, Oct. 2, 1984, 64 pgs.

Press Release, PhoNet Communications Ltd., "PhoNet Introduces EtherPhone: The First Data PBX Solution to Offer Toll Quality, Scalability, and Fault Tolerance Regardless of Network Topology," Oct. 10, 1997, 2 pgs.

Nance, Barry, "Your PC's Ringing—Answer It!," CMP Media LLC, BYTE Digest, Byte.com, (archived Feb. 1997), 5 pgs.

CTI News, Year End Issue, New Products From Amtelco XDS, Technology Marketing Corporation, 2007, 18 pgs.

Cohen, Danny et al., "A Network Voice Protocol NVP–II," USC/ISI/ ISI/RR–81–90, Apr. 1, 1981, 75 pgs.

Cohen, Danny "Using Local Area Networks for Carrying Online Voice," Proceedings of the IFIP TC 6 International In–Depth Symposium on Local Computer Networks, edited by Piercario Ravasio, Ing. Olivetti & C.S.p.A., Ivrea, Italy, Greg Hopkin, The MITRE Corporation, Medford, Massachusetts, and Najah Naffah, INRIA, Le Chesnay, France, North Holland Publishing Company, Florence, Italy, Apr. 19–21, 1982, pp. 13–21.

Schooler, Eve M. et al., "A Packet–switched Multimedia Conferencing System," University of Southern California, Information Sciences Institute, Marina del Rey, California, Reprinted from the ACM SIGOIS Bulletin, vol. 1, No. 1 (January 1989), pp. 1–22.

Ober, Katie, "Assessing Validity of Computerized Voice Stress Analysis," study conducted at Edinboro University of Pennsylvania, presented at the 31st Annual Western Pennsylvania Undergraduate Psychology Conference–Mercyhurst College, Erie, Pennsylvania, Apr. 2003, 2 pgs.

Press Release, PhoNet Communications Ltd., "PhoNet Communications Introduces PhoNetWork For Voice Calls over Intranets or the Internet," Oct. 10, 1997, 1 pg.

Russ, Donna, "Speech Recognition: Ripe for the Picking," Customer Interface (Jun. 2002), 3 pgs.

Neustein, Amy, "Using Sequence Package Analysis to Improve Natural Language Understanding," Linguistic Technology Systems, New York, New York, Kluwer Academic Publishers, International Journal of Speech Technology vol. 4 (2001), pp. 31–44.

Neustein, Amy, "Sequence Package Analysis: A Data Mining Tool to Speed Up Wiretap Analysis," Linguistic Technology Systems, Edgewater, New Jersey, presented at AVIOS May 10, 2002, 4 pgs.

"Speech Analytics –The Art of Automated Voice Analysis in the Contact Center," Robert Frances Group IT Agenda, Feb. 26, 2002, 4 pgs.

Herrell, Elizabeth, "Telephony@Work Globalizes Contact Center Platform with Multi–Lingual Support," IdeaByte, copyright 2002 Giga Information Group, Mar. 11, 2002, 1 pg.

Neustein, Ph. D., Amy, "Sequence Package Analysis: A New Natural Language Understanding Method for Performing Data Mining of Help–Line Calls and Doctor–Patient Interviews," Linguistic Technology Systems, Edgewater, New Jersey, published proceedings of the Natural Language Understanding and Cognitive Science Workshop at the 6th ICEIS (Univerisity of Portugal, Apr. 13, 2004), 11 pgs.

Lazarus, David, "Now call centers can make Nice on Phone," SFGate.com, Jan. 30, 2005, 4 pgs.

Herrell, Elizabeth, "Genesys And VoiceGenie: Speech Leaders Merge," GuickTake, Forrester Research, Apr. 11, 2006, 2 pgs.

McCanne, et al., "The BSD Packet Filter: A New Architecture for User–level Packet Capture," Lawrence Berkeley Laboratory, Berkeley, California, (preprint of paper to be presented at the 1993 Winter USENIX conference, Jan. 25–29, 1993, San Diego, California), (Dec. 19, 1992), 11 pgs.

Hirschberg, Julia et al., "Prosodic and Other Cues to Speech Recognition Failures," Department of Elsevier B.V., Speech Communication, vol. 43 (2004) pp. 155–175.

Hirschberg, Julia et al., "The Influence of pitch range, duration, amplitude and spectral features on the interpretation of the rise–fall–rise intonation contour in English," Journal of Phonetics, vol. 20, (1992) pp. 241–251.

Hargadon, Andrew et al., "Building an Innovation Factory, "Harvard Business Review (HBR OnPoint), Product No. 6102 (May–Jun 2000), pp. 1, 3–17.

* cited by examiner

VOICE INTERACTION ANALYSIS MODULE

Matter enclosed in heavy brackets [ ] appears in the original patent but forms no part of this reissue specification; matter printed in italics indicates the additions made by reissue.

*CROSS-REFERENCE TO RELATED APPLICATIONS*

*Notice: More than one reissue application has been filed for the reissue of U.S. Pat. No. 6,757,361. The reissue applications are: "Voice Interaction Analysis Module," Ser. No. 11/509,553, filed on Aug. 24, 2006 (the present application); "Machine Learning Based Upon Feedback From Contact Center Analysis," Ser. No. 11/509,550, filed on Aug. 24, 2006; "Distributed Analysis of Voice Interaction Data," Ser. No. 11/509,554, filed on Aug. 24, 2006; "Distributed Recording of Voice Interaction Data," Ser. No. 11/509,552, filed on Aug. 24, 2006; "VoIP Voice Interaction Monitor," Ser. No. 11/509,549, filed on Aug. 24, 2006; "VoIP Voice Interaction Recorder," Ser. No. 11/509,551, filed on Aug. 24, 2006; and, "Communication Management System for Network-Based Telephones," Ser. No. 11/583,381, filed on Oct. 19, 2006, all of which are divisional reissues of "Signal Monitoring Apparatus Analyzing Voice Communication Content," Ser. No. 11/477,124, filed on Jun. 28, 2006, which is a reissue of U.S. Pat. No. 6,757,361, issued on Jun. 29, 2004.*

BACKGROUND OF THE INVENTION

The present invention relates to signal monitoring apparatus and in particular, but riot exclusively to telecommunications monitoring apparatus which may be arranged for monitoring a plurality of telephone conversations.

DESCRIPTION OF THE RELATED ART

Telecommunications networks are increasingly being used for the access of information and for carrying out commercial and/or financial transactions. In order to safeguard such use of the networks, it has become appropriate to record the two-way telecommunications traffic, whether voice traffic or data traffic, that arises as such transactions are carried out. The recording of such traffic is intended particularly to safeguard against abusive and fraudulent use of the telecommunications network for such purposes.

More recently, so-called "call-centers" have been established at which operative personnel are established to deal with enquiries and transactions required of the commercial entity having established the call-center. An example of the increasing use of such call-centers is the increasing use of "telephone banking" services and the telephone ordering of retail goods.

Although the telecommunications traffic handled by such call-centers is monitored in an attempt to preserve the integrity of the call-centre, the manner in which such communications networks, and their related call-centers, are monitored are disadvantageously limited having regard to the data/information that can be provided concerning the traffic arising in association with the call-center.

For example, in large call-centers, it is difficult for supervisors to establish with any confidence that they have accurately, and effectively, monitored the quality of all their staff's work so as to establish, for example, how well their staff are handling customers' enquiries and/or transaction requirements, or how well their staff are seeking to market/publicise a particular product etc.

SUMMARY OF THE INVENTION

The present invention seeks to provide for telecommunications monitoring apparatus having advantages over known such apparatus.

According to one aspect of the present invention there is provided signal monitoring apparatus comprising:

- means for monitoring signals representing communications traffic;
- means for identifying at least one predetermined parameter by analysing the content of at least one monitored signal;
- means for recording the occurrence of the identified parameter;
- means for identifying the traffic stream associated with the identified parameter;
- means for analysing the recorded data relating to the said occurrence; and
- means, responsive to the analysis of the said recorded data, for controlling the handling of communications traffic within the apparatus.

Preferably, the means for controlling the handling of the communications traffic serves to identify at least one section of traffic relative to another.

Also, the means for controlling may serve to influence further monitoring actions within the apparatus.

Advantageously, the analysed contents of the at least one signal comprise the interaction between at least two signals of traffic representing an at least two-way conversation. In particular, the at least two interacting signals relate to portions of interruption or stiltedness within the traffic.

Preferably, the means for monitoring signals can include means for recording signals.

Preferably, the means for recording the occurrence of the parameter comprises means for providing, in real time, a possibly instantaneous indication of said occurrence, and/or comprises means for storing, permanently or otherwise, information relating to said occurrence.

Dependent upon the particular parameter, or parameters, relevant to a call-center provider, the present invention advantageously allows for the improved monitoring of traffic so as to identify which one(s) of a possible plurality of data or voice interactions might warrant further investigation whilst also allowing for statistical trends to be recorded and analysed.

The apparatus is advantageously arranged for monitoring speech signals and indeed any form of telecommunication traffic.

For example, by analysing a range of parameters of the signals representing traffic such as speech, data or video, patterns, trends and anomalies within a plurality of interactions can be readily identified and these can then be used for example, to influence future automated analysis, and rank or grade the conversations and/or highlight conversations likely to be worthy of detailed investigation or playback by the call-center provider. The means for monitoring the telecommunications signals may be advantageously arranged to monitor a plurality of separate two-way voice, data or video conversations, and this makes the apparatus particularly advantageous for use within a call-centre.

The means for monitoring the telecommunications signals advantageously arranged to monitor the signals digitally by any one variety of appropriate means which typically involve the use of high impedance taps into the network and which have little, or no, effect on the actual network.

It should of course be appreciated that the invention can be arranged for monitoring telecommunications signals transmitted over any appropriate medium, for example a hardwired network comprising twisted pair or co-axial lines or indeed a telecommunications medium employing radio waves.

In cases where the monitored signal is not already in digital form, the apparatus can advantageously include analogue/digital conversion means for operating on the signal produced by the aforesaid means for monitoring the telecommunications signals.

It should also be appreciated that the present invention can comprise means for achieving passive monitoring of a telecommunications network or call-centre etc.

The means for identifying the at least one predetermined parameter advantageously includes a Digital Signal Processor which can be arranged or operate in accordance with any appropriate algorithm. Preferably, the signal processing required by the means for identifying the at least one parameter can advantageously be arranged to be provided by spare capacity arising in the Digital Signal Processors found within the apparatus and primarily arranged for controlling the monitoring, compression and/or recording of signals.

As mentioned above, the particular parameters arranged to be identified by the apparatus can be selected from those that are considered appropriate to the requirements of, for example, the call-centre provider.

However, for further illustration, the following is a non-exhaustive list of parameters that could be identified in accordance with the present invention and assuming that the telecommunications traffic concerned comprises a plurality of two-way telephone interactions such as conversations:

- non-voice elements within predominantly voice-related interactions for example dialing, Interactive Voice Response Systems, and recorded speech such as interactive voice response prompts, computer synthesized speech or background noise such as line noise;
- the relationship between transmissions in each direction, for example the delay occurring, or the overlap between, transmissions in opposite directions;
- the amplitude envelope of the signals, so as to determine caller anger or apisodes of shouting;
- the frequency spectrum of the signal in various frequency bands;
- advanced parameters characterizing the actual speaker which may advantageously be used in speech authentication;
- measures of the speed of interaction, for example for determining the ratio of word to inter-word pauses;
- the language used by the speaker(s);
- the sex of the speaker(s);
- the presence or absence of particular words, for example word spotting using advanced speech recognition techniques;
- the frequency and content of prosody including pauses, repetitions, stutters and nonsensical utterances in the conversation;
- vibration or tremor within a voice; and
- the confidence/accuracy with which words are recognized by the receiving party to the conversation so as to advantageously identify changes in speech patterns arising from a caller.

Parameters such as the following, and having no direct relationship to each call's content, can also be monitored:

- date, time, duration and direction of call:
- externally generated "tagging" information for transferred calls or calls to particular customers;

As will be appreciated, the importance of each of the above parameters and the way in which they can be combined to highlight particular good, or bad, caller interactions can be readily defined by the call-center provider.

Advantageously, the apparatus can be arranged so as to afford each of the parameters concerned a particular weighting, or relative value.

The apparatus may of course also be arranged to identify the nature of the data monitored, for example whether speech, facsimile, modem or video etc. and the rate at which the signals are monitored can also be recorded and adjusted within the apparatus.

According to a further feature of the invention, the means for identifying at least one parameter can be arranged to operate in real time or, alternatively, the telecommunications signals can be recorded so as to be monitored by the means for identifying at least one parameter at some later stage.

Advantageously, the means for recording the actual occurrence of the identified parameter(s) can be arranged to identify an absolute value for such occurrences within the communications network and/or call-centre as a whole or, alternatively, the aforementioned recording can be carried out on a per-conversation or a per-caller/operative basis.

The means for recording the occurrence of the identified parameter(s) can advantageously be associated means for analysing the results of the information recorded so as to identify patterns, trends and anomalies within the telecommunications network and/or call-center.

Advantageously, the means for recording the occurrence of the identified parameter(s) can, in association with the means for identifying the predetermined parameter and the means for monitoring the telecommunications signals, be arranged to record the aforementioned occurrence in each of the two directions of traffic separately.

Preferably, the means for identifying the source of the two-way traffic includes means for receiving an identifier tagged on to the traffic so as to identify its source, i.e. the particular operative within the call-centre or the actual caller. Alternatively, means can be provided within the telecommunications monitoring apparatus for determining the terminal number, i.e. the telephone number, of the operative and/or the caller.

The aforementioned identification can also be achieved by way of data and/or speech recognition.

It should also be appreciated that the present invention can include means for providing an output indicative of the required identification of the at least one predetermined parameter. Such output can be arranged to drive audio and/or visual output means so that the call-centre provider can readily identify that a particular parameter has been identified and in which particular conversation the parameter has occurred. Alternatively, or in addition, the occurrence of the parameter can be recorded, on any appropriate medium for later analysis.

Of course, the mere single occurrence of a parameter need not establish an output from such output means and the apparatus can be arranged such that an output is only provided once a decision rule associated with such parameter(s) has been satisfied. Such a decision rule can be arranged such that it depends on present and/or past values of the parameter under consideration and/or other parameters.

Further, once a particular conversation has been identified as exhibiting a particular predetermined parameter, or satisfying a decision rule associated with such parameters, the apparatus can be arranged to allow ready access to the telecommunications "line" upon which the conversation is occurring so that the conversation can be interrupted or suspended as required.

As mentioned previously, the apparatus can be arranged to function in real time or, alternatively, the apparatus can include recording means arranged particularly to record the telecommunications traffic for later monitoring and analysis.

Preferably, the apparatus includes means for reconstructing the signals of the telecommunications traffic to their original form so as, for example, to replay the actual speech as it was delivered to the telecommunications network and/or call-center.

The apparatus can therefore advantageously recall the level of amplification, or attenuation, applied to the signal so as to allow for the subsequent analysis of the originating signal with its original amplitude envelope.

Further, the apparatus may include feedback means arranged to control the means for monitoring the telecommunications signals responsive to an output from means being provided to identify the source of the conversation in which the parameter has been identified, or the decision rule associated with the parameter has been exceeded.

A further embodiment of the present invention comprises an implementation in which means for recording and analysing the monitored signals are built into the actual system providing the transmission of the original signals so that the invention can advantageously take the form of an add-in card to an Automatic Call Distribution System or any other telecommunications system.

Also, it will be appreciated that the present invention can be advantageously arranged so as to be incorporated into a call-centre and indeed the present invention can provide for such a call-centre including apparatus as defined above.

In accordance with another aspect of. the present invention, there is provided a method of monitoring signals representing communications traffic, and comprising the steps of:

identifying at least one predetermined parameter associated with a monitored signal;

recording the occurrence of the identified parameter; and identifying the traffic stream in which the parameter was identified.

The invention is therefore particularly advantageous in allowing the monitoring of respective parts of an at least two-way conversation and which may include the of analysis of the interaction of those parts.

Of course, the method of the present invention can advantageously be arranged to operate in accordance with the further apparatus features defined above.

*BRIEF DESCRIPTION OF THE DRAWINGS*

The invention is described further hereinafter, by way of example only, with reference to the accompanying drawings in which.

DESCRIPTION OF THE EMBODIMENT

As mentioned above, the apparatus can advantageously form part of a call-centre in which a plurality of telephone conversations can be monitored so as to provide the call-centre operator with information relating to the "quality" of the service provided by the call-centre operatives. Of course, the definition of "quality" will vary according to the requirements of the particular call-centre and, more importantly, the requirements of the customers to the call-centre but typical examples are how well the call-centre operatives handle customers telephone calls, or how well an Interactive Voice Response System serves customers calling for, for example, product details.

The system generally comprises apparatus for the passive monitoring of voice or data signals, algorithms for the analysis of the monitored signals and, apparatus for the storage and reporting of the results of the analysis.

Optional features can include apparatus for recording the actual monitored signals particularly if real time operation is not required, and means for reconstructing the monitored signals into their original form so as to allow for, for example, replay of the speech signal.

Figure 1:
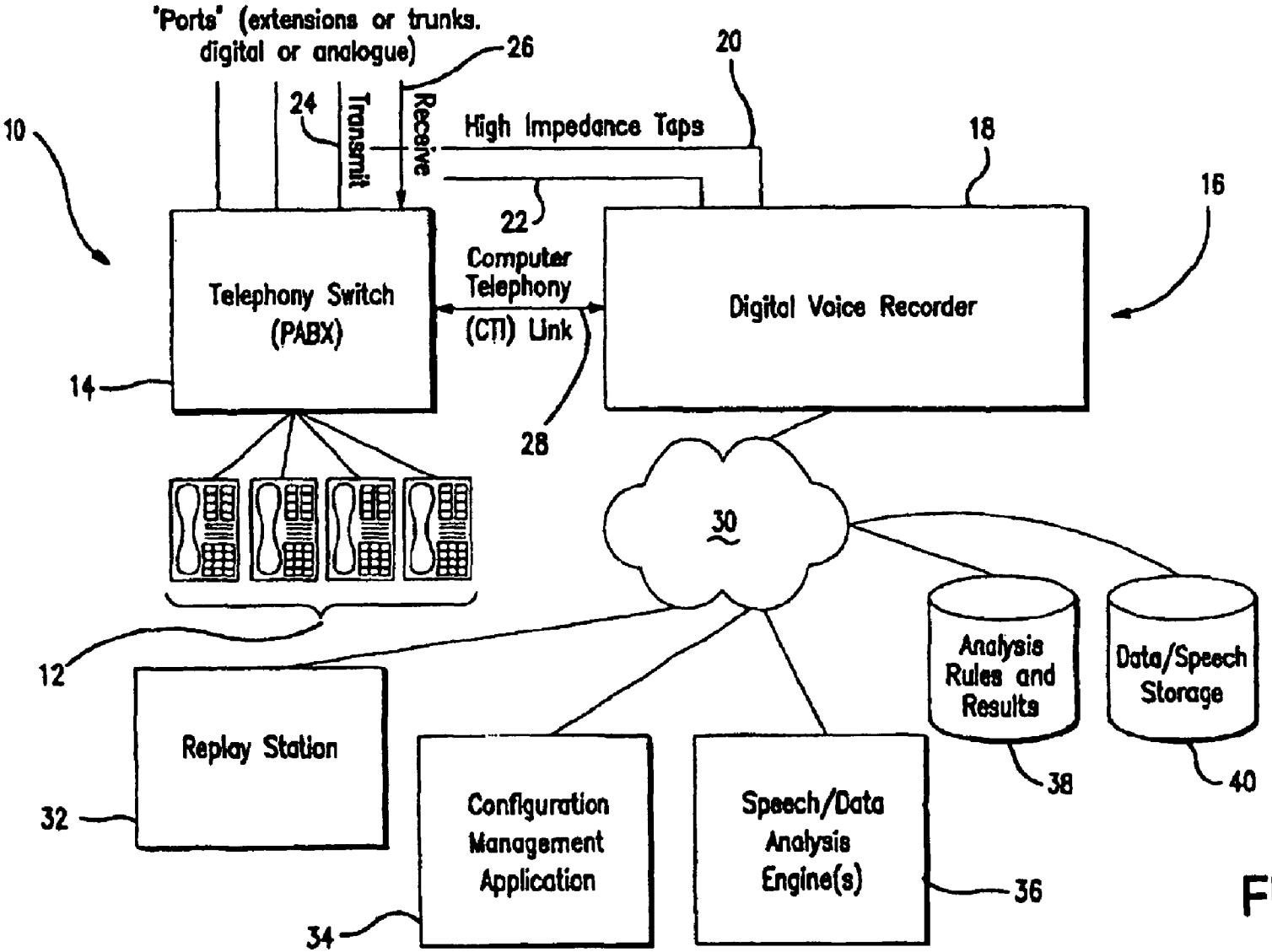
FIG. 1 is a block diagram of a typical recording and analysis system embodying the present invention.

FIG. 1 is a block diagram of a recording and analysis system for use in association with a call-centre 10 which includes an exchange switch 14 from which four telephone terminals 12 extend: each of which is used by one of four call-centre operatives handling customer enquiries/transactions via the exchange switch 14.

The monitoring apparatus 16 embodying the present invention, comprises a digital voice recorder 18 which is arranged to monitor the two-way conversation traffic associated with the exchange switch 14 by way of high impedance taps 20, 22 which are connected respectively to signal lines 24, 26 associated with the exchange switch 14. As will be appreciated by the arrows employed for the signal lines 24, 26, the high impedance tap 20 is arranged to monitor outgoing voice signals from the call-centre 10 whereas the high impedance tap 22 is arranged to monitor incoming signals to the call-centre 10. The voice traffic on the lines 24, 26 therefore form a two-way conversation between a call-centre operative using one of the terminals 12 and a customer (not illustrated).

The monitoring apparatus 16 embodying the present invention further includes a computer telephone link 28 whereby data traffic appearing at the exchange switch 14 can be monitored as required.

The digital voice recorder 18 is connected to a network connection 30 which can be in the form of a wide area network (WAN), a local area network (LAN) or an internal bus of a central processing unit of a computer.

Also connected to the network connection 30 is a replay station 32, a configuration management application station 34, a station 36 providing speech and/or data analysis engine(s) and also storage means comprising a first storage means 38 for the relevant analysis rules and the results obtained and a second storage means 40 for storage of the data and/or speech monitor.

Figure 2:
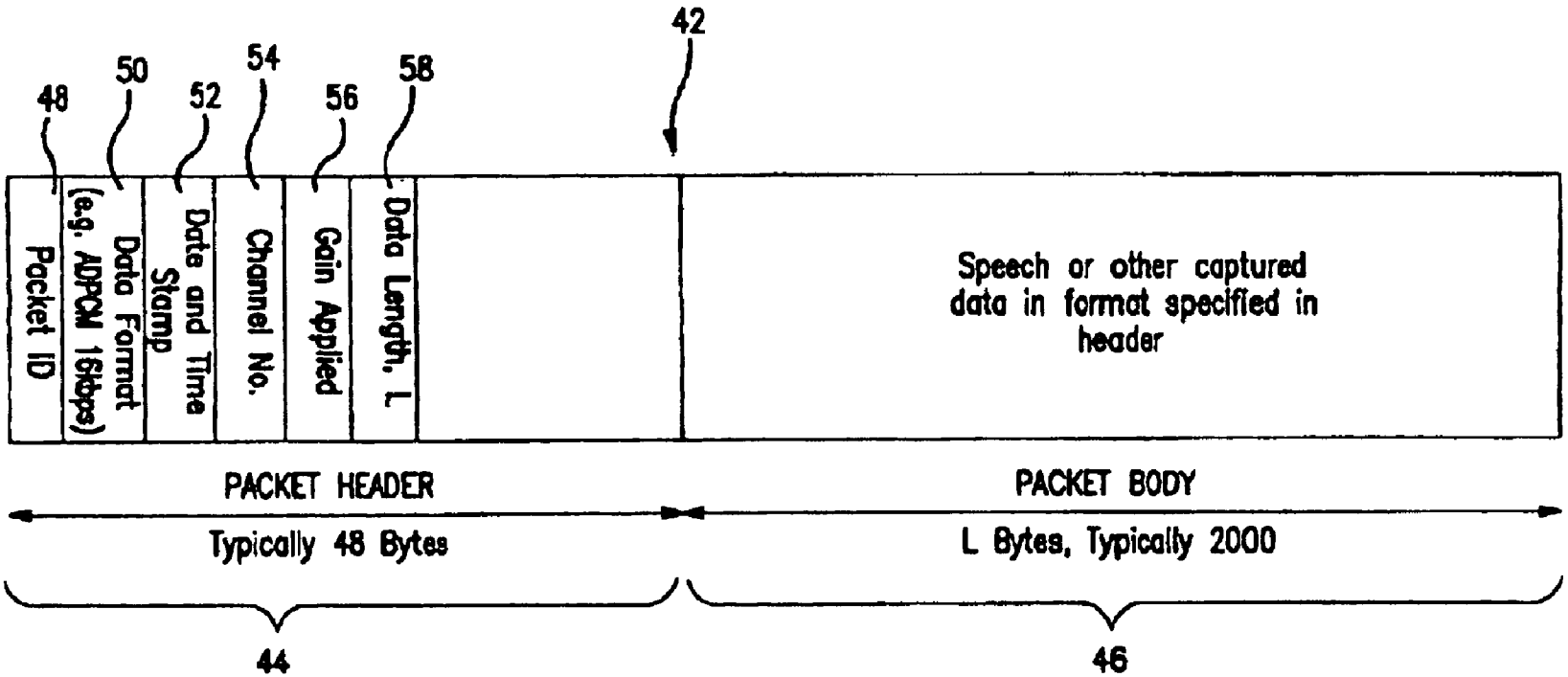
FIG. 2 is a diagram illustrating a typical data packetisation format employed within the present invention.

FIG. 2 illustrates the typical format of a data packet 42 used in accordance with the present invention and which comprises a packet header 44 of typically 48 bytes and a packet header 46 of typically of 2000 bytes.

The packet header is formatted so as to include the packet identification 48, the data format 50, a date and time stamp 52, the relevant channel number within which the data arises 54, the gain applied to the signal 56 and the data length 58.

The speech, or other data captured in accordance with the apparatus of the present invention, is found within the packet body 46 and within the format specified within the packet header 44.

The high impedance taps 20, 22 offer little or no effect on the transmission lines 24, 26 and, if not in digital form, the monitored signal is converted into digital form. For example, when the monitored signal comprises a speech signal, and signal is typically converted to a pulse code modulated (PCM) signal or is compressed as an Adaptive Differential PCM (ADPCM) signal.

Further, where signals are transmitted at a constant rate, the time of the start of the recordings is identified, for example by voltage or activity detection, i.e. so-called "vox" level detection, and the time is recorded. With asynchronous data signals, the start time of a data burst, and optionally the intervals between characters, may be recorded in addition to the data characters themselves.

The purpose of this is to allow a computer system to model the original signal in appropriate values of time, frequency and amplitude so as to allow the subsequent identification of one or more of the various parameters arising in association with the signal. The digital information describing the original signals is then analysed at station 36, in real time or later, to determine the required set of metrics, i.e. parameters, appropriate to the particular application.

A particular feature of the system is in recording the two directions of data transmission separately so allowing further analysis of information sent in each direction independently. In analogue telephone systems, this may be achieved by use of a four-wire (as opposed to two-wire) circuit whilst in digital systems, it is the norm to have the two directions of transmission separated onto separate wire pairs. In the data world, the source of each data packet is typically stored alongside the contents of the data packet.

A further feature of the system is in recording the level of amplification or attenuation applied to the original signal. This may vary during the monitoring of even a single interaction (e.g. through the use of Automatic Gain Control Circuitry). This allows the subsequent reconstruction and analysis of the original signal amplitude.

Another feature of the system is that monitored data may be "tagged" with additional information such as customer account numbers by an external system (e.g. the delivery of additional call information via a call logging port or computer telephony integration (CTI) port).

The importance of each of the parameters and the way in which they can be combined to highlight particularly good or bad interactions is defined by the use of the system. One or more such analysis profiles can be held in the system. These profiles determine the weighting given to each of the above parameters.

The profiles are normally used to rank a large number of monitored conversations and to identify trends, extremes, anomalies and norms. "Drill-down" techniques are used to permit the user to examine the individual call parameters that result in an aggregate or average score and, further, allow the user to select individual conversations to be replayed to confirm or reject the hypothesis presented by the automated analysis.

A particular variant that can be employed in any embodiment of the present invention uses feedback from the user's own scoring of the replayed calls to modify its own analysis algorithms. This may be achieved using neural network techniques or similar giving a system that learns from the user's own view of the quality of recordings.

A variant of the system uses its own and/or the scoring/ranking information to determine its further patterns of operation i.e.

- determining which recorded calls to retain for future analysis,
- determining which agents/lines to monitor and how often, and
- determining which of the monitored signals to analyse and to what depth.

In many systems it is impractical to analyse all attributes of all calls hence a sampling algorithm may be defined to determine which calls will be analysed. Further, one or more of the parties can be identified (e.g. by calling-line identifier for the external party or by agent log-on identifiers for the internal party). This allows analysis of the call parameters over a number of calls handled by the same agent or coming from the same customer.

The system can use spare capacity on the digital signal processors (DSPs) that control the monitoring, compression or recording of the monitored signals to provide some or all of the analysis required. This allows analysis to proceed more rapidly during those periods when fewer calls are being monitored.

Spare CPU capacity on a PC at an agent's desk could be used to analyse the speech. This would comprise a secondary tap into the speech path being recorded as well as using "free" CPU cycles. Such an arrangement advantageously allows for the separation of the two parties, e.g. by tapping the headset/handset connection at the desk. This allows parameters relating to each party to be stored even if the main recording point can only see a mixed signal.

A further variant of the system is an implementation in which the systems recording and analysing the monitored signals are built into the system providing the transmission of the original signals (e.g. as an add-in card to an Automatic Call Distribution (ACD) system).

The apparatus illustrated is particularly useful for identifying the following parameters:

- degree of interruption (i.e. overlap between agent talking and customer talking);
- comments made during music or on-hold periods;
- delays experienced by customers (i.e. the period from the end of their speech to an agent's response);
- caller/agent talk ratios, i.e. which agents might be talking too much.

However, it should be appreciated that the invention could be adapted to identify parameters such as:

- "relaxed/stressed" profile of a caller or agent (i.e. by determining changes in volume, speed and tone of speech)
- frequency of keywords heard (separately from agents and from callers) e.g. are agents remembering to ask follow-up questions about a certain product/service etc; or how often do customers swear at each agent? Or how often do agents swear at customers?
- frequency of repeat calls. A combination of line, ID and caller ID can be provided to eliminate different people calling from single switchboard/business number
- languages used by callers?
- abnormal speech patterns of agents. For example if the speech recognition applied to an agent is consistently and unusually inaccurate for, say, half an hour, the agent should be checked for: drug abuse, excessive tiredness, drunkenness, stress, rush to get away etc.

It will be appreciated that the illustrated and indeed any embodiments of the present invention can be set up as follows.

The Digital Trunk Lines (e.g. T1/E1) can be monitored trunk side and the recorded speed tagged with the direction of speech. A MediaStar Voice Recorder chassis can be provided typically with one or two E1/T1 cards plus a number of DSP cards for the more intense speech processing requirements.

Much of its work can be done overnight and in time, some could be done by the DSPs in the mediastar's own cards. It is also necessary to remove or at least recongise, periods of music, on-hold periods, IVR rather than real agents speaking etc. thus, bundling with Computer Integrated Telephony Services such as Telephony Services API (TSAPI) in many cases is appropriate.

Analysis and parameter identification as described above can then be conducted. However, as noted, if it is not possible to analysed all speech initially, analysis of a recorded signal can be conducted.

It any case the monitoring apparatus may be arranged to only search initially for a few keywords although re-play can be conducted so as to look for other keywords.

It should be appreciated that the invention is not restricted to the details of the foregoing embodiment. For example, any appropriate form of telecommunications network, or signal transmission media, can be monitored by apparatus according to this invention and the particular parameters identified can be selected, and varied, as required.

What is claimed is:

[1. A signal monitoring system for monitoring and analyzing communications passing through a monitoring point, the system comprising:

a digital voice recorder (18) for monitoring two-way conversation traffic streams passing through the monitoring point, said digital voice recorder having connections (20) for being operatively attached to the monitoring point;

a digital processor (30) connected to said digital voice recorder for identifying at least one predetermined parameter by analyzing the voice communication content of at least one monitored signal taken from the traffic streams;

a recorder (38) attached to said digital processor for recording occurrences of the predetermined parameter;

a traffic stream identifier (36) for identifying the traffic stream associated with the predetermined parameter;

a data analyzer (36) connected to said digital processor for analyzing the recorded data relating to the occurrences; and a communication traffic controller (34) operatively connected to said data analyzer and, operating responsive to the analysis of the recorded data, for controlling the handling of communications traffic within said monitoring system.]

[2. The monitoring system of claim 1, wherein said at least one predetermined parameter includes a frequency of keywords identified in the voice communication content of the at least one monitored signal.]

[3. The monitoring system of claim 1, wherein said digital processor further identifies episodes of anger or shouting by analyzing amplitude envelope.]

[4. The monitoring system of claim 1, wherein said at least one predetermined parameter is a prosody of the voice communication content of the at least one monitored signal.]

[5. The monitoring system of claim 1, wherein said connections for being operatively attached to the telephony exchange switch are attached via high impedance taps (20) to telephone signal lines (24, 26) attached to said telephony exchange switch.]

[6. The monitoring system of claim 1, wherein said communication traffic controller serves to identify at least one section of traffic relative to another so as to identify a source of the predetermined parameter.]

[7. The monitoring system of claim 1, wherein said communication traffic controller serves to influence further monitoring actions within the apparatus.]

[8. The monitoring system of claim 1, wherein the analyzed contents of the at least one monitored signal comprise the interaction between at least two signals representing an at least two-way conversation.]

[9. The monitoring system of claim 1, wherein the recorder operates in real time to provide a real-time indication of the occurrence.]

[10. The monitoring system of claim 1, wherein said digital voice recorder comprises an analog/digital convertor (18) for converting analog voice into a digital signal.]

[11. The monitoring system of claim 1, wherein said digital processor is a Digital Signal Processor (30) arranged to operate in accordance with an analyzing algorithm.]

[12. The monitoring system of claim 1, wherein the digital processor is arranged to operate in real time.]

[13. The monitoring system of claim 1, further comprising a replay station (32) connected to said digital processor and arranged such that the voice communication content of the at least one monitored signal can be recorded and monitored by said digital processor for identifying the at least one parameter at some later time.]

[14. The monitoring system of claim 1, wherein the at least one predetermined parameter comprises plural predetermined parameters and wherein said recorder records the occurrence of the plural predetermined parameters in each of the two directions of traffic separately.]

[15. The monitoring system of claim 1, wherein said traffic stream identifier comprises a means for receiving an identifier tagged onto the traffic so as to identify its source.]

[16. The monitoring system of claim 1, wherein said digital voice recorder for monitoring the traffic streams is operative responsive to an output from said traffic stream identifier identifying the source of the conversation in which the predetermined parameter has been identified, or a threshold occurrence of the predetermined parameter has been exceeded.]

[17. The monitoring system of claim 1, wherein said digital voice recorder, said digital processor, said recorder, said traffic stream identifier, and said data analyzer reside on an add-in card to a telecommunications system.]

*18. A system for monitoring and analyzing two-way voice communications passing through a call center, the system comprising:*

*a recorder operable to acquire two-way conversation voice traffic, the two-way conversation voice traffic occurring during a call center voice interaction;*

*an analysis module, the analysis module being configured to analyze the voice traffic for parameters within the two-way conversation voice traffic using one or more analysis algorithms, the analysis module outputting any patterns, trends, or anomalies.*

*19. The system of claim 18, wherein the recorder is operable to capture the two-way conversation traffic in real-time or to retrieve the two way conversation voice traffic from a system data store.*

*20. The system of claim 18, wherein the analysis module is operable to receive feedback and modify any of the analysis algorithms based upon the received feedback.*

*21. The system of claim 18, wherein the analysis module comprises a call center analysis module.*

*22. The system of claim 21, wherein the call center analysis module comprises a distributed analysis module, whereby one or more call center agent computers comprise components of the distributed analysis module, the distributed analysis module being operable to use any of the one or more call center agent computers when said center agent computer has spare processing capacity.*

*23. The system of claim 18, further comprising a distributed capture module operable to utilize spare processing capacity from one or more call center agent computers to capture the two-way conversation voice traffic.*

*24. The system of claim 18, wherein the two-way conversation voice traffic comprises data packets transmitted over a computer network, the data packets comprising a packet header and a packet body.*

*25. The system of claim 24, wherein the recorder is operable to analyze the packet headers to determine whether to capture the data packets associated with the packet headers.*

*26. The system of claim 24, wherein the system is a computer station, and further comprises a storage module operable to store at least a portion of the data packets.*

*27. The system of claim 18, wherein the analysis module is operable to identify the occurrence of at least one predetermined parameter of voice communication content within the two-way conversation voice traffic.*

*28. The system of claim 27, wherein identifying the occurrence of said at least one predetermined parameter includes flagging and recording two-way conversation voice traffic that includes a talk-over condition.*

*29. The system of claim 27, wherein identifying the occurrence of said at least one predetermined parameter includes recording and flagging two-way conversation voice traffic that includes one or more of a predetermined group of words.*

*30. The system of claim 27, wherein identifying the occurrence of said at least one predetermined parameter includes recording and flagging two-way conversation voice traffic that includes stress on either or both sides of the conversation as indicated by changes in volume, speed and tone of speech.*

*31. The system of claim 27, wherein identifying the occurrence of said at least one predetermine parameter includes recording and flagging two-way conversation voice traffic that includes anger on either side or both sides of the conversation as identified by analyzing a voice envelope associated with the incoming or outgoing traffic streams.*

*32. The system of claim 27, wherein identifying the occurrence of said at least one predetermine parameter includes recording and flagging two-way conversation voice traffic that includes a delay between transmissions in opposite directions.*

*33. The system of claim 18, further comprising a call scoring module operable to analyze customer experience during voice interactions and assign a score to the voice interactions.*

*34. The system of claim 33, wherein the call scoring module uses such parameters as delay between transmissions in opposite directions, anger, stress, or use of one or more of a group of words to analyze customer experience during the voice interaction.*

*35. The system of claim 18, further comprising a communication traffic controller operable to assert control over that have been identified as including one or more of said anomalies.*

*36. The system of claim 35, wherein the digital processor is operable to notify a supervisor responsive to the occurrence of said at least one predetermined parameter.*

*37. The system of claim 18, the data analysis module is operable to direct a recording module to record two-way conversation voice traffic based upon the occurrence of one or more of one or more of said patterns, trends, or anomalies.*

*38. The system of claim 37, wherein the data analysis module is further operable to instruct the recording module to flag a record based upon the occurrence of one or more of said patterns, trends, or anomalies.*

*39. A system for monitoring and analyzing two-way voice communications passing through a call center, the system comprising:*

*a recorder operable acquire two-way conversation voice traffic, the two-way conversation voice traffic occurring during a call center voice interaction;*

*an analysis module, the analysis module being configured to analyze the two-way conversation voice traffic using one or more speech analysis algorithms and to produce exchange data based upon the two-way conversation voice traffic;*

*wherein the analysis module is further configured to analyze the exchange data for parameters within the two-way conversation voice traffic using one or more data analysis algorithms and to output any patterns, trends, or anomalies.*

* * * * *